F. W. ZIEMENDORF.
COUPLING FOR CHAINS.
APPLICATION FILED SEPT. 20, 1920.
1,383,898. Patented July 5, 1921.
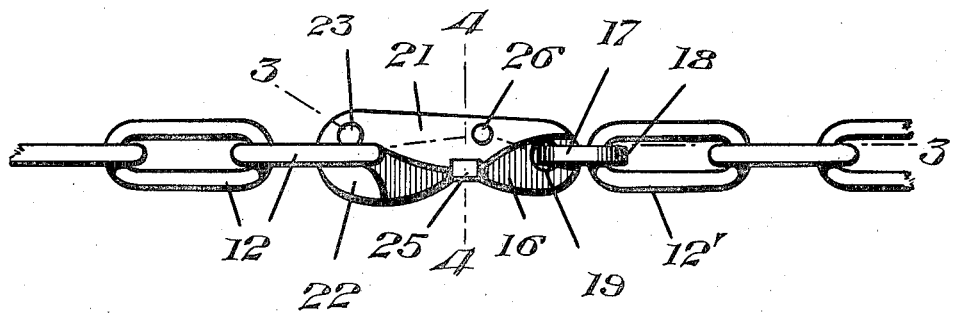
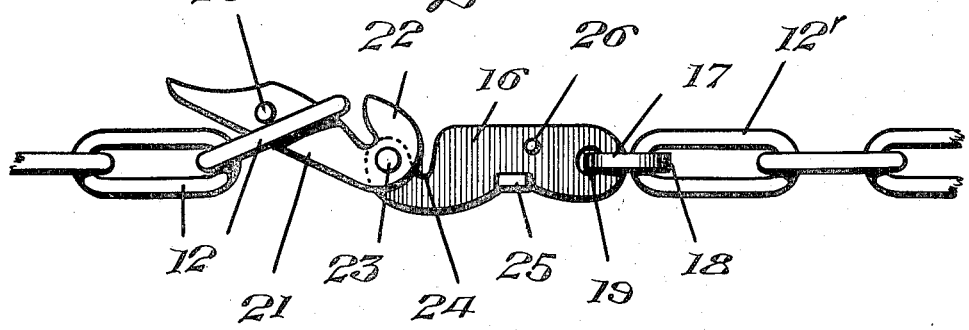
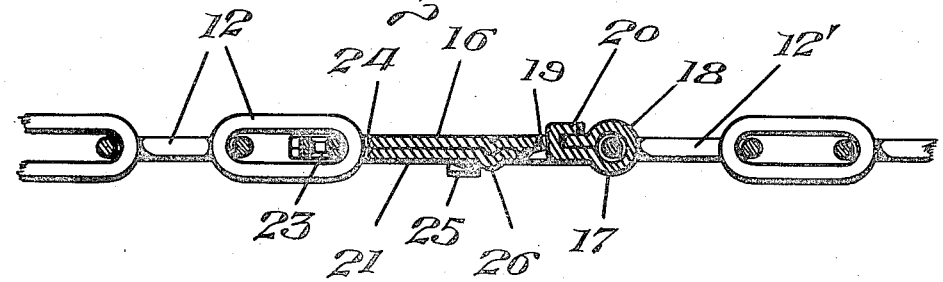
Inventor
F. W. ZIEMENDORF
By W. J. Fitz Gerald Co.
Attorney

UNITED STATES PATENT OFFICE.

FRED W. ZIEMENDORF, OF NEENAH, WISCONSIN.

COUPLING FOR CHAINS.

1,383,898.  Specification of Letters Patent.  Patented July 5, 1921.

Original application filed May 11, 1920, Serial No. 380,558. Divided and this application filed September 20, 1920. Serial No. 411,383.

*To all whom it may concern:*

Be it known that I, FRED W. ZIEMENDORF, a citizen of the United States, residing at Neenah, in the county of Winnebago and State of Wisconsin, have invented certain new and useful Improvements in Couplings for Chains; and I do hereby declare the following to be a full, clear, and exact description of the invention, such as will enable others skilled in the art to which it appertains to make and use the same.

The present invention relates to couplers for chains and this application is a division of the application for patent on non-skid devices filed May 11, 1920, Serial No. 380,558.

The object of the invention is the provision of a novel and improved coupling or fastener for conveniently attaching and securely holding the ends of a chain together, in order that the terminals can not only be pulled together tightly, but will also be held coupled without danger of accidental uncoupling or loosening, and the device being simple in construction and manufacture as well as being thoroughly practical and efficient in use.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation showing the coupler in closed position.

Fig. 2 is a side elevation showing the coupler in position as when attaching the ends of the chain or separating same.

Figs. 3 and 4 are longitudinal and cross sections, respectively, on the lines 3—3 and 4—4 of Fig. 1.

The present device is intended for use in connecting the chains of non-skid devices for automobile tires, but can be used for other purposes, as will be readily apparent.

The coupling comprises the flat link member or plate 16 having a strap 17 extending from one end and bent back to form a loop or eye 18 engaging a terminal link 12' of the chain. This strap 17 is bent back to overlap the member 16, and said member has an aperture 19 near the corresponding end, through which the terminal of the strap 17 extends and is then bent back to form a hook 20, which serves to anchor the terminal of said strap to the member 16, to prevent the member 16 and terminal link of the chain from pulling apart even under a heavy strain.

A latch 21 forms a part of the coupling, and is also preferably composed of a flat plate or member, being formed at one end with a hook 22, and the bend of the hook 22 overlaps the opposite end of the member 16 and is pivoted thereto, as at 23, permitting said latch to be swung against one side of the member 16 longitudinally thereof, as seen in Fig. 1.

When the latch 21 is swung away from the member 16, as seen in Fig. 2, one of the terminal links 12 of the chain opposite to the other terminal to which the member 16 is connected, can be readily passed over the latch, and by swinging the latch toward the member 16, it serves as a lever for pulling the ends of the chain toward one another with considerable force, whereby to tighten the chain. The member 16 has a lateral recess 24 adjacent to the pivot 23, for receiving the link of the chain when the lever or latch 21 overlaps the member 16 in bringing them together. The corresponding link of the chain will therefore seat in the recess 24, and will also seat in the hook 22 whereby to securely connect the ends of the chain. That edge of the member 16 opposite to the edge having the recess 24 has a hooked stop 25 to limit the movement of the latch 21 when swung against the side of said member, and said member and latch have indentations 26 or similar portions to snap together near the stop 25, whereby to hold the latch in closed position against accidental opening thereof. The seat of the hook 22 is so arranged, as seen in Fig. 1, that the tendency for the ends of the chain to separate will also have a tendency to swing the latch 21 against the stop 25, the link which is engaged by the latch 21 moving past the pivot 23 (or past dead center) as said link is moved into connection with the member 16. This arrangement, in connection with the portions 26, will avoid accidental disconnection of the terminals of the chain, but by swinging the latch 21 manually away from the member 16, the terminals of the chain can be separated, the link on the latch 21 being readily slipped off of same.

Having thus described the invention, what is claimed as new is:—

A coupling comprising a flat link member, a latch having a hook at one end overlapping and pivoted to one end portion of said member so that the latch can be swung against one side of said member, said link member having a recess in one edge at one end near said pivot for receiving a link fitted on said latch when the latch is swung against said side of the member, said hook being arranged for the seating of the link therein when the latch is swung against the side of said member, and said link member having a hooked stop at the opposite edge for limiting the movement of and receiving the latch, said member and latch having portions to spring into engagement near said stop when the latch is swung against the stop.

In testimony whereof I have signed my name to this specification in the presence of two subscribing witnesses.

FRED W. ZIEMENDORF.

Witnesses:
E. G. LAMPERT,
WM. CAMPBELL.